United States Patent
Sako et al.

(10) Patent No.: US 7,334,391 B2
(45) Date of Patent: Feb. 26, 2008

(54) ELECTRIC POWER SUPPLY EQUIPMENT

(75) Inventors: Masaaki Sako, Kobe (JP); Hideaki Ota, Ibaraki (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 10/559,093

(22) PCT Filed: Oct. 6, 2003

(86) PCT No.: PCT/JP03/12754

§ 371 (c)(1),
(2), (4) Date: Aug. 14, 2006

(87) PCT Pub. No.: WO2004/111412

PCT Pub. Date: Dec. 23, 2004

(65) Prior Publication Data
US 2007/0022733 A1 Feb. 1, 2007

(30) Foreign Application Priority Data
Jun. 13, 2003 (JP) .............................. 2003-169219

(51) Int. Cl.
- F02C 9/28 (2006.01)
- F02C 9/40 (2006.01)
- F02C 3/22 (2006.01)
- F01K 23/10 (2006.01)
- F02M 21/02 (2006.01)
- F02D 29/06 (2006.01)
- F23K 5/00 (2006.01)

(52) U.S. Cl. ................ 60/39.27; 60/39.281; 60/39.465
(58) Field of Classification Search ...............
60/39.461–39.465, 39.12, 39.281, 39.27
See application file for complete search history.

(56) References Cited

U.S. PATENT DOCUMENTS

| | | | | |
|---|---|---|---|---|
| 5,408,886 A | * | 4/1995 | Lalin ............................ | 73/861 |
| 5,456,107 A | * | 10/1995 | Padden et al. ................ | 73/239 |
| 5,661,969 A | * | 9/1997 | Beebe et al. ............. | 60/39.281 |
| 5,953,899 A | | 9/1999 | Rao et al. | |

(Continued)

FOREIGN PATENT DOCUMENTS

JP 60-262890 12/1985

(Continued)

*Primary Examiner*—Ted Kim
(74) *Attorney, Agent, or Firm*—Fitch, Even, Tabin & Flannery

(57) ABSTRACT

An electric power supply system capable of maintaining stable power generation or the like regardless of variation in the amount of fuel gas being supplied and variation in the gas calorie, comprises a gas engine, a gas turbine, a suction device configured to collect the generating gas, a gas separating device configured to classify the gas collected according to the calorie, a gas calorie adjusting device configured to mix gases having different calories which are supplied from the gas separating device to adjust gas calorie before supplying to the gas engine and the gas turbine, a gas amount balance monitor device configured to monitor balance between the amount of gas being consumed by the gas turbine and the gas engine in operation and the amount of gas being supplied from the gas calorie adjusting device, and a system control device configured to control operation of the gas engine, operation of the gas turbine, and operation of the gas calorie adjusting device.

13 Claims, 8 Drawing Sheets

U.S. PATENT DOCUMENTS

| | | | |
|---|---|---|---|
| 6,190,429 B1 * | 2/2001 | Fujimura et al. | 48/197 R |
| 6,226,976 B1 * | 5/2001 | Scott et al. | 60/773 |
| 6,393,821 B1 * | 5/2002 | Prabhu | 60/781 |
| 6,595,001 B2 * | 7/2003 | Rautenbach et al. | 60/772 |
| 6,901,735 B2 * | 6/2005 | Lohn | 60/39.465 |
| 2002/0023628 A1 * | 2/2002 | Kilmer | 123/525 |
| 2002/0148229 A1 * | 10/2002 | Pont et al. | 60/776 |

FOREIGN PATENT DOCUMENTS

| | | | |
|---|---|---|---|
| JP | 10-047626 | | 2/1998 |
| JP | 10-310783 | | 11/1998 |
| JP | 2002-202006 | * | 7/2002 |
| JP | 2002-326071 | | 11/2002 |
| JP | 2003-065084 | | 3/2003 |
| JP | 2003-089795 | | 3/2003 |
| JP | 2003-106172 | | 4/2003 |
| JP | 2003-120419 | | 4/2003 |

* cited by examiner

ELECTRIC POWER SUPPLY EQUIPMENT

TECHNICAL FIELD

The present invention relates to an electric power supply system. More particularly, the present invention relates to an electric power supply system configured to collect self-producing gas and to generate electric power by utilizing the collected gas as fuel.

BACKGROUND ART

There are various combustible self-producing gases. For example, these are a coal bed gas (also referred to as a Coal Mine Gas and simply expressed as CMG) contained in coal beds, a biomass gas resulting from fermentation and putrefaction of general wastes or agricultural and livestock wastes, and so on. Especially, since coal beds in which coals are buried in large amount are existing all over the world, there is a large amount of CMG on the earth. When coal beds are mined for obtaining coal, CMG is captured and drained in advance for securing safety during mining work. The amount of CMG and contents of combustible component (most of which is methane) of CMG vary with a lapse of time. The variation in the content of the combustible component of the gas means that the gas has various calories.

Actually, all CMG is released to atmosphere around coal mines, or in the neighborhood of residential areas, the gas of high calorie (high-calorie gas) is collected and utilized in the city as a city gas, while the gas of low-calorie (low-calorie gas) is released to atmosphere without utilization, because the low calorie is insufficient to use as a city gas. In addition, the amount of self-producing high-calorie gas varies, and therefore there is a need for a huge gas storage facility keeping a large amount of the high-calorie gas for the purpose of stable supply.

Conventionally, there have been proposed technologies for utilizing the self-producing gases such as CMG for electric power generation. For example, there has been disclosed a system in which a gas engine generator capable of generating a predetermined amount of electric power using the self-producing low-calorie gas and another gas engine generator capable of generating a predetermined amount of electric power using the high-calorie gas (normal city gas) are combined to thereby allow power generation to be maintained while switching supply of the gas to these generators and their operating states (e.g., see Japanese Laid-Open Patent Application Publication No. 2002-202006). This system is intended to omit huge gas tanks that can store the self-producing gas by additionally using the normal city gas.

However, since the calorie and the amount of CMG constantly vary irregularly, controlling the system and procedure to fully utilize CMG becomes more complex. Specifically, since an electric power is generated by the gas engines, the number of gas engines that may start and stop according to variation in the amount of gas supply, must be well controlled. This unavoidably causes specified gas engines to repeat start and stop so frequently, which may lead to shortened lives of the gas engines, and unstability of power distribution network. Furthermore, stable supply of the city gas is essentially needed, and therefore, in order to realize the above-described system in coal mining areas or landfill sites of wastes, such large-scale infrastructure as a city gas supplying system is required to be prepared.

Meanwhile, there has been proposed a technology in which electric power is generated by a gas turbine using CMG as fuel, and the resulting carbon dioxide as exhausted gas is fed into coal beds and fixed therein together with air free from oxygen (e.g., see Japanese Laid-Open Patent Application Publication No. 2003-74372). However, this document does not disclose a system or a method for maintaining stable power generation by efficiently consuming low-calorie gas regardless of perpetual variation in the amount and calorie of the self-producing gas, which are the basic characteristic of the CMG.

DISCLOSURE OF THE INVENTION

The present invention has been developed to solve the above-described problems, and an object of the present invention is to provide an electric power supply system capable of maintaining stable power generation or the like regardless of perpetual variation in the amount of supply of the self-producing gas and perpetual variation in its calorie.

In order to achieve the above-described object, an electric power supply system comprises a gas engine; a gas turbine; a gas collecting device configured to collect a gas being generated; a gas separating device configured to classify the gas collected by the gas collecting device according to a content of combustible component contained in the gas; a calorie adjusting device configured to mix gases having different contents of the combustible component which are supplied from the gas separating device to adjust the content of the combustible component of the gas to be supplied to the gas engine and the gas turbine; and a system control device configured to control an operation of the gas engine, an operation of the gas turbine, and an operation of the calorie adjusting device.

In accordance with this system, it is possible to separate the collected gas according to the content of the combustible component contained therein, to operate the gas turbine with changing its load, to adjust the gas calorie to be constant within a predetermined range by the calorie adjusting device, and so on. Thereby, in spite of the perpetual variation in the amount of gas generation as well as the variation in the content of the combustible component of the gas, it is possible to avoid wasting the gas and lowering efficiency in power generation in the system due to such variations. In addition, the self-producing low calorie gas, which has been released to the atmosphere, can be utilized as a new energy source which is free of change for use. The self-producing gas may include coal mine gas, biomass gas resulting from fermentation and putrefaction of wastes, combustible gas generated from polluted sludge in sewage or landfill sites of waste, and so on. As used herein, the gas engine refers to a reciprocating engine, in which a gas is supplied to an inside of a cylinder as a fuel and combusted therein, and its rotational output is applied for electric power generation.

The electric power supply system may further comprise: a gas amount balance monitor device configured to monitor balance of supply and demand between an amount of the gas consumed by the gas engine and the gas turbine under operating condition and an amount of the gas supplied from the calorie adjusting device to the gas turbine and the gas engine, wherein the system control device is configured to control the operation of at least one of the gas engine, the gas turbine, and the calorie adjusting device, based on a signal from the gas amount balance monitor device.

The electric power supply system may further comprise an exhausting device provided on a gas supply passage through which the gas is supplied to the gas turbine and the gas engine, to release the gas in the gas supply passage to outside, wherein the system control device may be configured to control an operation of the exhausting device based on the signal from the gas amount balance monitor device. The system control device is configured to send an instruction to the exhausting device to cause it to release the gas based on a signal indicative of excess gas supply, which is sent from the gas amount balance monitor device, or to send an instruction to the exhausting device to cause it to stop releasing the gas, based on a signal indicative of deficiency of gas supply, which is sent from the gas amount balance monitor device.

Preferably, the electric power supply system may further comprise a heat recovery boiler connected to the gas turbine. Thereby, the above demand can be met. Also, the electric power supply system may further comprise a steam turbine in the heat recovery boiler, and by doing so, energy efficiency can be further improved.

The gas separating device may include, as major components, a combustible component meter configured to continuously measure the content of the combustible component of the gas collected by the gas collecting device, a plurality of gas supply passages through which the gases according to predetermined ranges of the content of the combustible component are supplied, and a passage-switching means configured to select one of the plurality of gas supply passages based on measurement results from the combustible component meter and to perform switching to the selected gas supply passage.

The calorie adjusting device may include, as major components, a plurality of gas supply passages to which gases separated according to the content of the combustible component by the gas separating device are supplied, a mixed gas supply passage to which the plurality of gas supply passages are connected, the mixed gas supply passage extending to the gas engine and the gas turbine, and opening and closing means configured to adjust open positions of the plurality of gas supply passages. In this construction, the gases with different contents of combustible component can be mixed to allow the gas to have a predetermined content. Also, in addition to the plurality of gas supply passages, the calorie adjusting device may further include an air supply passage to supply air. This facilitates adjustment of the content of the combustible component.

It is preferable that the calorie adjusting device includes a feedback combustible component meter provided on the mixed gas supply passage, and a calorie adjustment control device configured to control the opening and closing means to allow the content of the combustible component to be set in a predetermined range, based on measurement results of the feedback combustible component meter. In this configuration, variation in the contents of the combustible component can be dealt with.

In the electric power supply system, the gas amount balance monitor device may be provided on the mixed gas supply passage extending from the calorie adjusting device to the gas engine and the gas turbine, the gas amount balance monitor device may include, as major components, a closed container connected with the mixed gas supply passage, a pressure detector configured to detect an internal pressure of the closed container, and a first balance detector configured to detect a degree of balance of supply and demand through comparison between detection results of the pressure detector and a preset reference pressure. In this configuration, when the amount of gas supply increases or decreases in relation to the amount of gas demand (amount of gas to be consumed by the gas engine and the gas turbine), the pressure in the closed container correspondingly increases or decreases. Thus, the degree of balance of supply and demand of the gas can be easily detected.

In the electric power supply system, the gas amount balance monitor device may be provided on the mixed gas supply passage extending from the calorie adjusting device to the gas engine and the gas turbine, and the gas amount balance monitor device may include, as major components, a container having an upper end opening and configured to be connected with the mixed gas supply passage, a top lid configured to be vertically movable along inside of the container and to air-tightly close the upper end opening of the container, a position detector configured to detect a position of the top lid moving vertically, according to varying pressure in the container, and a second balance detector configured to detect a degree of balance of supply and demand based on a detection signal from the position detector. Also, in this construction, the degree of balance of supply and demand of the gas can be easily detected.

In the electric power supply system, the system control device may be configured to perform control to cause at least one gas turbine in operating condition to adjust its load according to variation in an amount of gas supply during operation of both the gas engine and the gas turbine. The gas turbine is capable of easily varying its load during operation, and this characteristic is especially suitable for smoothly dealing with variation in the amount of gas supply. On the other hand, the gas engine has higher power generation efficiency than that of the gas turbine, and is less susceptible to variation in atmospheric temperature, and therefore, such a configuration is more efficient and rational as the gas engines that generate electric power by combusting the gas (within a range of stable gas generation amount) that is not more than a minimum amount of the generating gas. In this manner, power generation efficiency is more increased and life of the system is more extended. In this case, the system control device may be configured to perform all controls according to a signal indicative of variation in the amount of gas supply from the gas amount balance monitor device.

An embodiment of an electric power supply system of the present invention will be described with reference to the attached drawings.

BEST MODE FOR CARRYING OUT THE INVENTION

Figure 1:
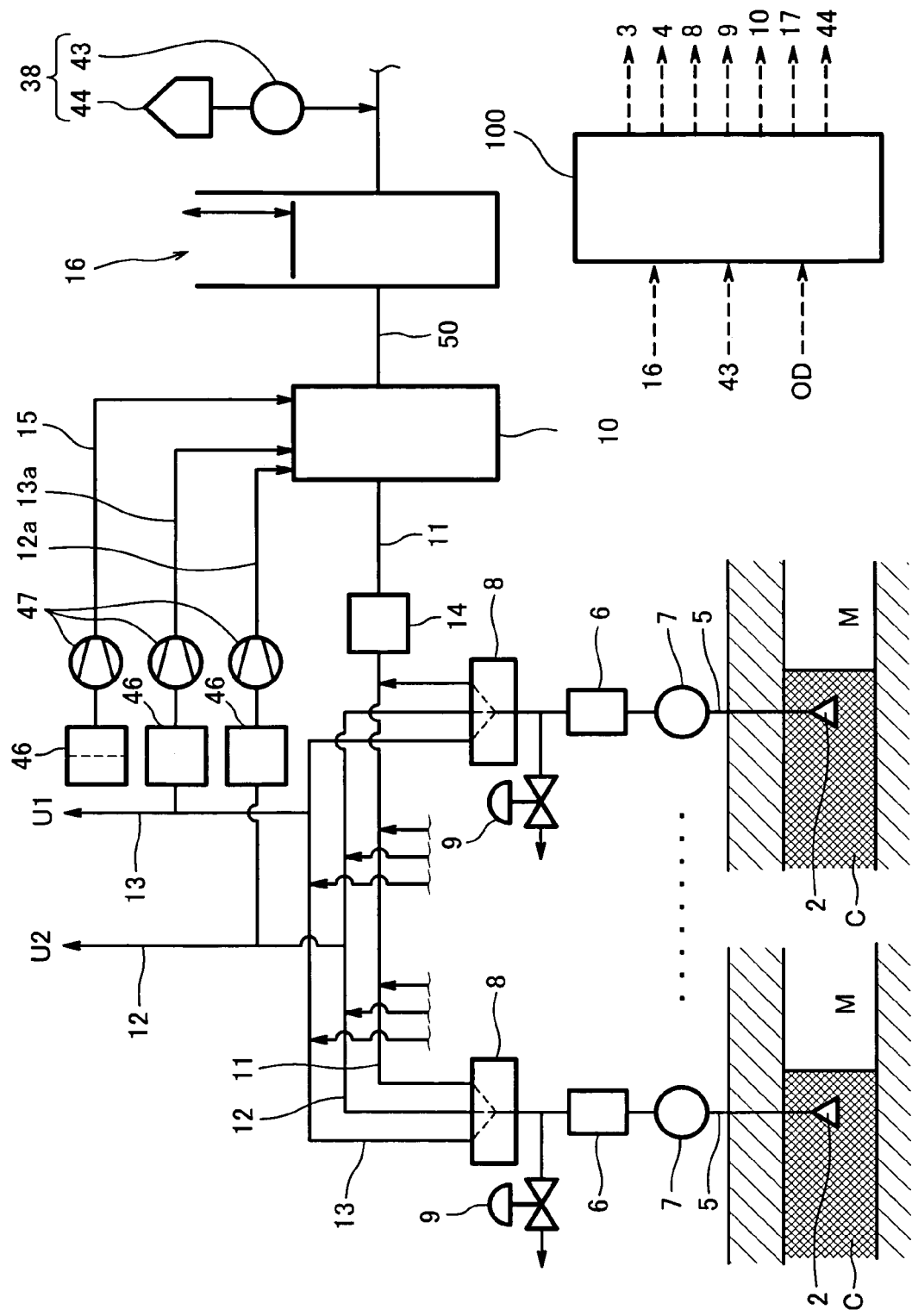
FIG. 1 is a block diagram showing a part of a system according to an embodiment of the present invention.
Figure 2:
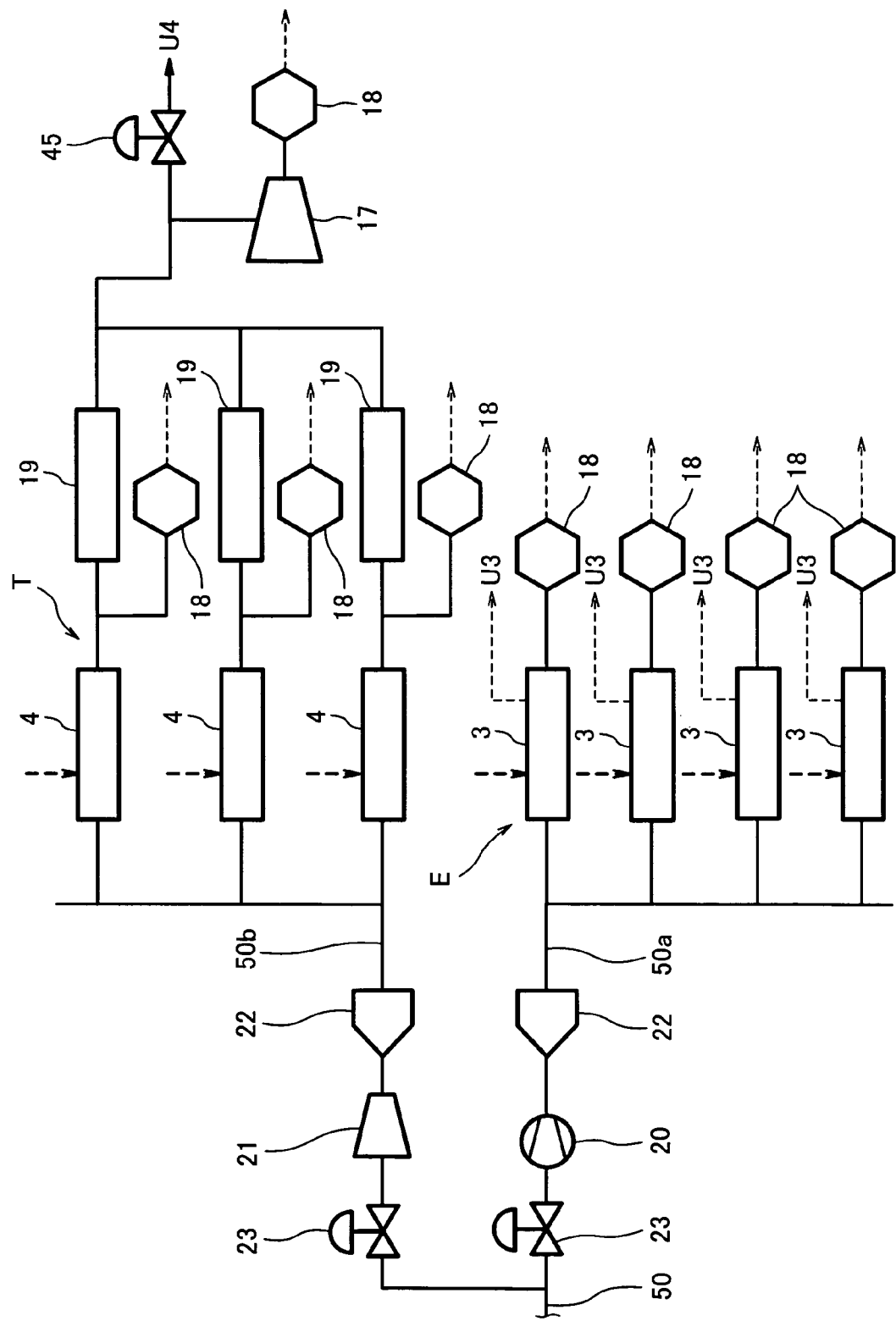
FIG. 2 is a block diagram showing another part of the system according to the embodiment of the present invention.

FIG. 1 and FIG. 2 are block diagrams each showing an electric power supply system (hereinafter simply referred to as a system) 1 according to an embodiment of the present invention. For the sake of convenience, the system 1 is illustrated as being divided into two parts, but these parts are connected integrally to each other. A right-hand end of a mixed gas supply piping 50 in FIG. 1 is connected to a left-hand end of the mixed gas supply piping 50 in FIG. 2. That is, FIG. 1 shows a collecting system of a source gas in this system and FIG. 2 shows a system including gas engines and gas turbines to generate electric power and heat from the collected gas. The above-described systems in FIG. 1 and FIG. 2 are connected to each other through pipings, control cables, and so on. In FIG. 1 and FIG. 2, as the source of the self-producing gas, mine cavities M and coal beds C are illustrated. The gas being collected from the coal beds C of the mine cavities M are called Coal Mine Gas containing methane as a main combustible component. The system 1 is configured to combust the methane as fuel and to gain electric power and heat (steam, hot water, etc) from its thermal heat energy.

As shown in FIG. 1, gas collecting ports 2 are provided in coal beds C of the coal cavities M. The collecting ports 2 serve to collect methane contained in the coal beds C before mining is started, to minimize leakage of the methane into the mine cavities M where miners are working. The collecting ports 2 are provided in each of coal beds C in each neighborhood of the mine cavity M. In order to secure safe mining, collect combustible gases such methane efficiently, and minimize leakage of the combustible gases into the mine cavity M, a required number of (a plurality of) collecting ports 2 are provided in coal beds C. The gas collecting ports 2 are connected with gas engines 3 and gas turbines 4 in FIG. 2 through pipings 5, 11, and 50. Various devices are installed on the pipings 5, 11, and 50. Hereinbelow, it is assumed that these devices are installed on the pipings 5, 11 and 50. First, a suction device 6 is installed with a blower or the like that suctions the gas from the collecting port 2. The suction device 6 and the collecting port 2 constitute a gas collecting device. A flow meter 7 is installed on the piping 5.

A gas separating device 8 is provided on a downstream side of the gas flow of each suction device 6. The gas separating device 8 serves to classify and separate the collected gas according to the content of combustible gas component (hereinafter represented by methane), as will be described in detail later. Plural types of gases (three types of gases in this embodiment) classified according to the concentration of the methane are allocated to pipings 11, 12, and 13. The gas containing high-concentration methane is called a high-calorie gas, the gas containing low-concentration methane is called a low-calorie gas, and the gas containing intermediate-concentration methane is called an intermediate-calorie gas. The low-calorie gas is sent to the piping 11. The intermediate-calorie gas is sent to the piping 12. The high-calorie gas is sent to the piping 13. As defined herein, in this embodiment, the high-calorie gas contains methane of 60 volume % or more, the intermediate-calorie gas contains methane of not less than 40 volume % and less than 60 volume %, and the low-calorie gas contains methane of less than 40 volume %. By way of example, in this embodiment, the gas is classified into three types of gases, but this classification is only illustrative. As will be described later, the gas may be divided into four or more types of gases.

The high-calorie gas usable as industrial source gas is collected independently and supplied to user points U1. The intermediate-calorie gas usable as city gas is collected independently and supplied to user points U2. The low-calorie gas is mainly used as source gas in the system 1, while the high-calorie gas and the intermediate-calorie gas are partially used to adjust concentration of the low-calorie gas as required. This is only because the gas collected from coal beds C is perpetually unstable in its flow rate per unit time and/or the concentration of methane.

A relief valve 9 is provided between the suction device 6 and the gas separating device 8 to release to atmosphere the gas being collected. The relief valve 9 releases the collected gas for securing mining safety even during maintenance or failure of the gas separating device 8.

The low-calorie gas supply piping 11 extends from the gas separating device 8 and is connected to a gas calorie adjusting device 10. A filter (gas cleaner) 14 is provided on the low-calorie gas supply piping 11 extending to the gas calorie adjusting device 10. The gas calorie adjusting device 10 serves to adjust the methane concentration of the low-calorie gas delivered into the device 10, in order to maintain stable combustion in the gas engines 3 or the gas turbines 4, as will be described later. The gas calorie adjusting device 10 serves to adjust the concentration of methane as combustible component, and hence may be called a heating value adjusting device alternatively. A mixed gas supply piping 50 extends from the gas calorie adjusting device 10 to yards E and T where the gas engines 3 and the gas turbines 4 are installed.

When the methane concentration of the low-calorie gas being delivered to the gas calorie adjusting device 10 through the low-calorie gas supply piping 11 is within an allowable range, the gas calorie adjusting device 10 supplies the low-calorie gas to the mixed gas supply piping 50 on downstream side. On the other hand, when the methane concentration varies and becomes above or below the allowable range, then, air, the high-calorie gas, or the intermediate-calorie gas is selectively mixed with the low-calorie gas for concentration adjustment. For this purpose, a branch piping 13a extending from the high-calorie gas piping 13, a branch piping 12a extending from the intermediate calorie gas piping 12, and an air supply piping 15 are each connected to the gas calorie adjusting device 10. The pipings 12a, 13a, and 15 are provided with cleaners (including filters) 46 configured to remove dust or the like, and boosters (e.g., blowers) 47 configured to send the gas under pressure to the gas calorie adjusting device 10.

A gas amount balance monitor device 16 is provided on a downstream side of the gas calorie adjusting device 10 and connected thereto through the mixed gas supply piping 50. The gas amount balance monitor device 16 serves to balance the amount of gas being supplied from an upstream side and the amount of gas to be consumed by the gas engines 3 or the gas turbines 4, as will be described later. Due to variation in the amount of gas collected from coal beds C, the gas amount balance monitor device 16 needs to balance the amount of gas being supplied and the amount of gas being consumed by the gas engines 3 or the gas turbines 4. When the gas happens to be supplied excessively, the excess gas is released to atmosphere, while when the gas is supplied insufficiently, some of the gas turbines less loaded than other gas turbines are stopped, as described later. In other case, the gas calorie adjusting device 10 mixes the atmospheric air with the high-calorie gas or the intermediate-calorie gas to generate a required amount of the low-calorie gas and to supply the gas for making up for deficiency of the low-calorie gas.

As shown in FIG. 2, major components such as the gas engines 3, the gas turbines 4, heat recovery boilers 19, and steam turbines 17 are provided to generate electric power, and to supply steam and hot water using the gas collected from the coal beds C as fuel. The mixed gas supply piping 50 in FIG. 1 branches into pipings 50a and 50b, through which the fuel gas is supplied to the engine yard E and the turbine yard T. The piping 50a extending to the engine yard E and the piping 50b extending to the turbine yard T are respectively provided with shut-off valves 23.

The plurality of gas engines 3 are provided within the engine yard E. One generator 18 is connected to a corresponding gas engine E and configured to generate electric power. While four gas engines 3 are provided in this embodiment, the number of gas engines is not intended to be limited to three, but may be one, two, three, or five or more as desired. A plurality of gas engines 3 had better be provided in order to continue power generation when any of the engines 3 fails to operate or is stopped for maintenance. Hot water obtained through cooling the gas engines 3 and hot water obtained through heat recovery boiler in which an exhaust gas from the gas engines 3 flows are supplied to user points U3.

A combined cycle co-generation system is provided in the turbine yard T, for example. In this system, both the gas turbines 4 and the steam turbine 17 are provided for generating electric power most efficiently. Also, the system serves as a co-generation system which can supply steam as well. Specifically, each of the generators 18 is connected with a corresponding gas turbine 4 and configured to generate electric power. In addition, heat recovery boilers (hereinafter simply referred to as boilers) 19 are provided to generate steam by utilizing heat of the gas discharged from the gas turbines 4, and configured to supply steam to the steam turbine 17 described later and user points U4 that directly consume the steam. A flow rate control valve 45 is provided on a downstream side of the boilers 19 to adjust supply of the steam to the user points U4. The generator 18 is connected to the steam turbine 17. When a larger amount of steam is demanded during, for example, winter, the steam directly supplied from the boilers 19 to the user points U4 is increased, whereas when a small amount of steam is demanded during, for example, summer, the steam supplied from the boilers 19 to the steam turbine 17 is increased for power generation. These are controlled in accordance with an instruction from the system control device 100 as described later.

While three gas turbines 4 and one steam turbine 17 are provided in this embodiment, the quantity is not intended to be limited, but may be increased as planned and desired. When each of the gas turbines 4 is provided to a corresponding steam turbine 17, both may be connected with each other on the same shaft, and one generator 18 may be connected with the shaft. Also, instead of the combined cycle power generating unit described in this embodiment, a simple cycle may be adopted. The simple cycle is configured to generate electric power by using only gas turbines without steam turbines. The co-generation system can be configured by using the simple cycle. By installing boilers behind the gas turbines, residual heat in the exhausted gas can be recovered as steam. Further, in both of the combined cycle and the simple cycle, it is not necessary to adopt the co-generation system if the residual heat is not needed for purposes other than power generation.

As shown in FIG. 2, the mixed gas supply pipings 50a and 50b are provided with a boosting blower 20 configured to send the fuel gas under pressure to the gas engines 3 and a compressor 21 configured to send the fuel gas under pressure to the gas turbines 4, respectively. These gas boosting means are selected to generate gas pressures according to components to be used (engines or turbines). Specifically, the blower 20 is used to supply gas with relatively-low pressure to the gas engines 3, while the compressor 21 is used to supply gas with a relatively-high pressure to the gas turbines 4. A filter 22 is provided on downstream side of each of the blower 20 and the compressor 21 to remove dust from the gas.

Figure 3:
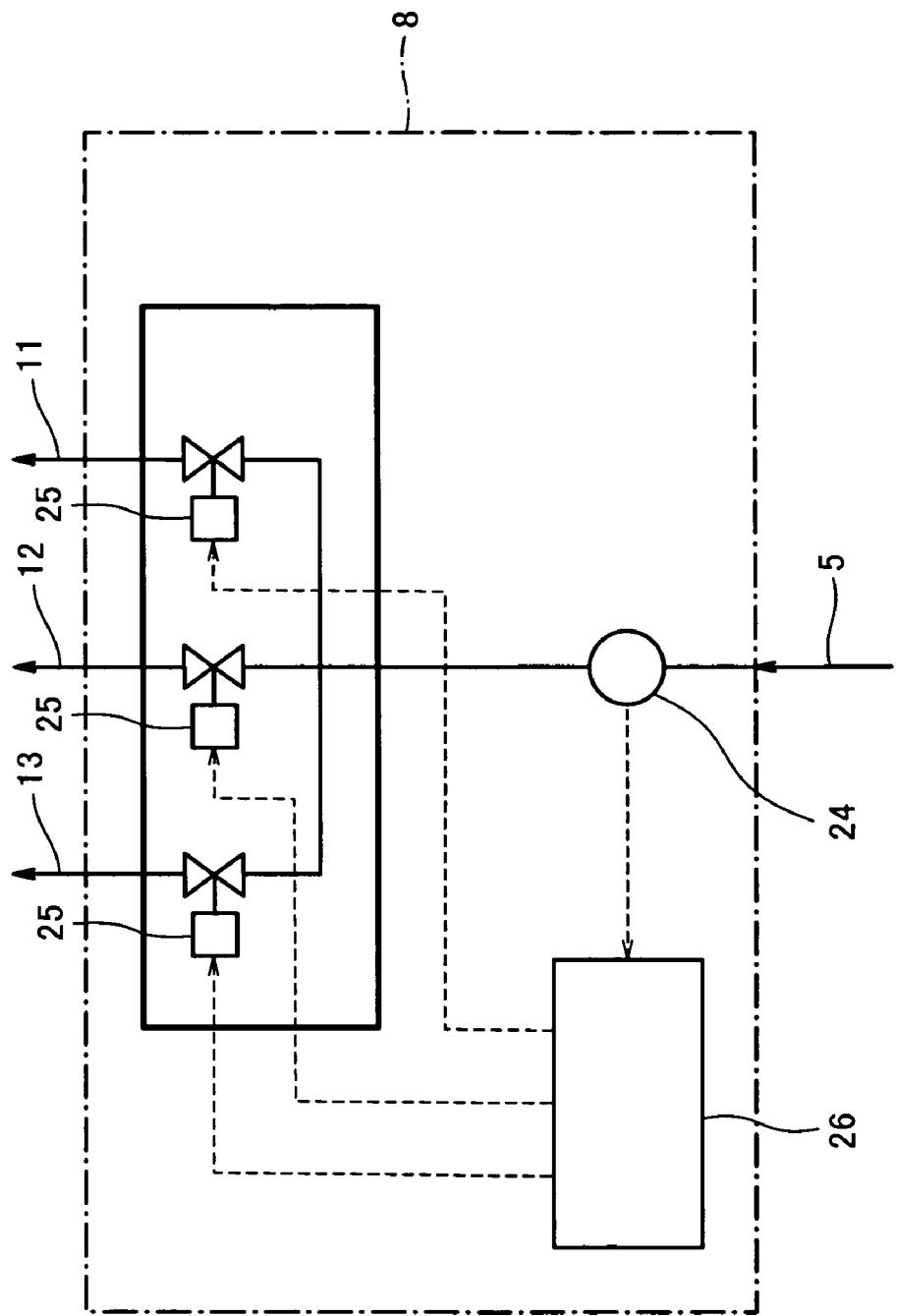
FIG. 3 is a block diagram showing an example of a gas separating device in the system in FIG. 1.

FIG. 3 shows the above-described gas separating device 8. In the gas separating device 8, the piping 5 branches into the pipings 11, 12, and 13. The gas separating device 8 comprises a combustible component meter (calorie meter) 24 installed on the piping 5, adjusting valves 25 respectively provided for the pipings 11, 12 and 13, and a gas separation control device 26 configured to control opening and closing of the adjusting valves 25 according to the methane concentration of the collected gas. The calorie meter 24 is of a methane concentration meter type configured to continuously measure a methane content of the collected gas.

The gas separation control device 26 opens the adjusting valve 25 on the pipings 11, 12, and 13, based on information in real time, indicative of the methane concentration of the collected gas from the calorie meter 24, and closes the adjusting valves 25 of the remaining pipings. In this configuration, the low-calorie gas is sent to the piping 11, the intermediate-calorie gas is sent to the piping 12, and the high-calorie gas is sent to the piping 13. The gas separating device 8 is capable of supplying gasses with the predetermined methane concentrations to the pipings 11, 12 and 13, respectively, regardless of variation in the methane concentration of the collected gas. As the calorie meter, a conventional type methane concentration meter may be used.

While the collected gas is classified into three types of gases according to methane concentration, i.e., the high-calorie gas, the intermediate-calorie gas, and the low-calorie gas, the collected gas may be classified into two or four or more types of gases. For example, the low-calorie gas containing a methane of less than 40 volume % may be further classified into a low-calorie gas containing a methane concentration ranging between 20 volume % and 40 volume %, and a low-calorie gas containing a methane concentration of less than 20 volume %. By doing so, the gas calorie adjusting device 10 to be described later can make calorific adjustment only by using the collected gas without providing the air supply piping 15. Such a change in classification standard may suitably be performed in accordance with an instruction from the control device 100 to be described later to the gas separation control device 26.

Figure 4:
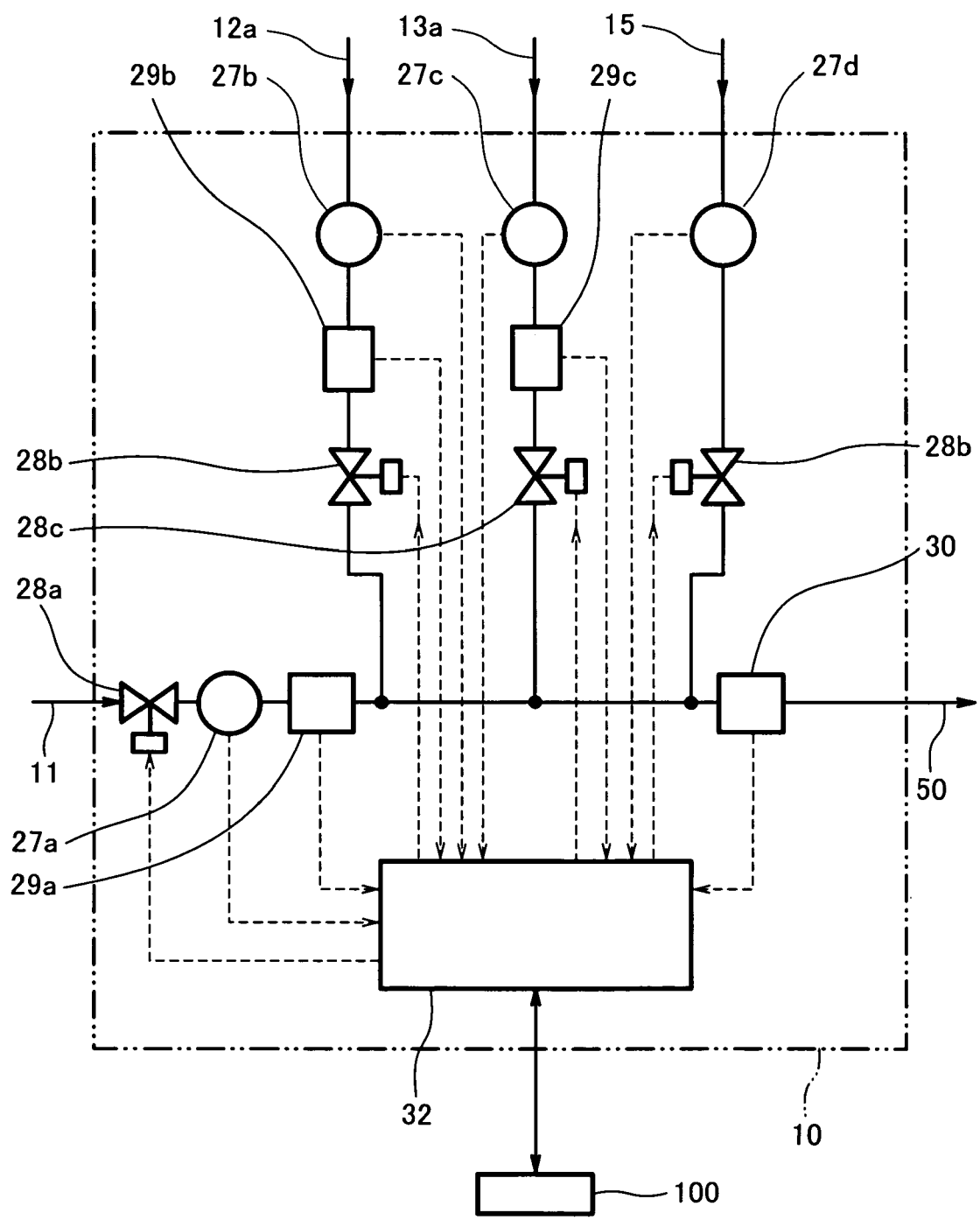
FIG. 4 is a block diagram showing an example of a gas calorie adjusting device in the system in FIG. 1.

FIG. 4 shows the gas calorie adjusting device 10. The low-calorie gas piping 11, the intermediate-calorie gas piping 12a, the high-calorie gas piping 13a, and the air supply piping 15 are each connected to the gas calorie adjusting device 10. More specifically, the intermediate-calorie gas piping 12a, the high-calorie gas piping 13a, and the air supply piping 15 are connected to the low-calorie gas piping 11 passing through the gas calorie adjusting device 10. The gas calorie adjusting device 10 comprises flow meters 27a, 27b, 27c, and 27d, flow rate control valves 28a, 28b, 28c, and 28d installed on the pipings 11, 12a, 13a, and 15, and calorie meters 29a, 29b, and 29c installed on the gas supply pipings 11, 12a, and 13a. In addition, the gas calorie adjusting device 10 comprises a calorie meter 30 installed on the mixed gas supply piping 50. Further, the gas calorie adjusting device 10 comprises a calorie adjustment control device 32.

In the calorie adjustment control device 32, a suitable range of methane concentration for performing ideal combustion in the gas engines 3 and the gas turbines 4 are predetermined. For example, the suitable range is specifically plus minus 2% of 35 volume %. In order to send the gas with such methane concentration to the mixed gas supply piping 50, each of the flow rate control valves 28*a*, 28*b*, 28*c*, and 28*d* within the gas calorie adjusting device 10 are controlled so. Specifically, feedback control is performed based on a methane concentration detection signal from the calorie meter 30 installed on the mixed gas supply piping 50.

For example, when the flow rate control valve 28*a* is opened, and it is judged that the methane concentration of the gas being delivered from the low-calorie gas piping 11 is within the above predetermined range, based on the signal from the calorie meter 30 (or calorie meter 29*a* of the piping 11), the flow rate control valves 28*b*, 28*c*, and 28*d* are closed, thereby allowing the gas to be supplied only from the piping 11. When the methane concentration exceeds the predetermined range, the flow rate control valve 28*d* of the air supply piping 15 is opened to decrease the methane concentration so that the concentration deviation may become zero, and kept adjusting its opening position in accordance with the signal from the calorie meter 30. Conversely, when the methane concentration becomes lower than the predetermined range, the flow rate control valve 28*b* of the intermediate-calorie gas piping 12 and/or the flow rate control valve 28*c* of the high-calorie gas piping 13 are appropriately opened to increase the methane concentration so that the concentration deviation may become zero, and kept adjusting their opening positions of the flow rate control valve 28*c* in accordance with the signal from the calorie meter 30. In this case, the opening position of the flow rate control valve 28*a* of the low-calorie gas piping 11 can be adjusted as desired.

As described later, a signal indicative of deficiency of gas supply is sent from the gas amount balance monitor device 16. Specifically, when the amount of gas being supplied from the mixed gas supply piping 50 is below the amount of gas required in the gas consumption yards E and T, the gas amount balance monitor device 16 sends the signal indicative of this. Accordingly, the gas calorie adjusting device 10 generates a low-calorie gas to make up for the deficiency of the gas. More specifically, in accordance with an instruction from the calorie adjustment control device 32, the flow rate control valve 28*b* of the intermediate-calorie gas 12 and/or the flow rate control valve 28*c* of the high-calorie gas piping 13, and the flow rate control valve 28*d* of the air supply piping 15 are opened, thereby generating the necessary amount of the low-calorie gas. A methane concentration thus generated low-calorie gas by mixing and the low-calorie gas being supplied from the low-calorie gas piping 11 is set within the predetermined range by the above-described control.

Figure 5:
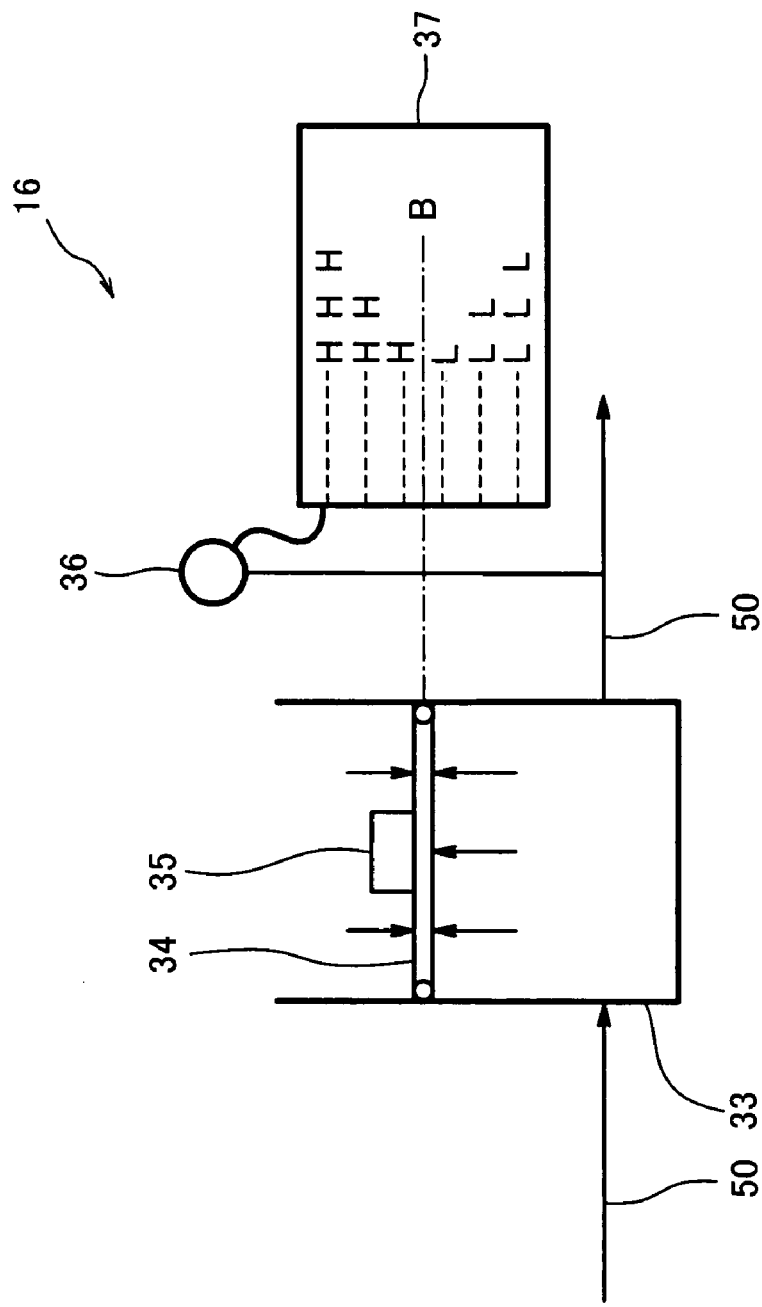
FIG. 5 is a block diagram showing an example of a gas amount balance monitor device in the system in FIG. 1.

FIG. 5 shows the gas amount balance monitor device 16. The gas amount balance monitor device 16 comprises a small-volume tank 33 connected with the mixed gas supply piping 50, a top lid 34 configured to air-tightly close an upper end opening of the tank 33 and to be vertically movable along inside of the tank 33, a counter-weight 35 installed on the top lid 34, a position sensor 36 configured to detect a vertical position (height) of the top lid 34, and a balance detector 37. The top lid 34 is vertically movable according to balance between the pushing down force of the top lid 34 with the counter-weight 35 and an atmospheric pressure, and the pushing up force by an internal pressure of the tank 33. As defined herein, the small volume of the tank 33 means, for example, the volume of the gas which may be consumed by one gas turbine for a period of 10 to 15 minutes. If the gas contains a methane concentration of 35 volume % and the gas turbine has a rated output of approximately 1600 kw, the volume is approximately 300 to 500 cubic meters. As the position sensor 36, a photoelectric type or a ultrasonic type may be used.

Instead of the top lid 34 configured to air-tightly close the upper end opening of the tank 33, a flexible bag like a balloon, which is connected with the mixed gas supply piping 50, may be provided in the tank 33, and a component capable of being detected by the position sensor 36 may be installed on the balloon.

In accordance with the gas amount balance monitor device 16, when the gas being supplied is equal in amount to the gas being consumed by the consumption yards E and T. i.e., these amounts are properly in balance, the internal pressure of the tank 33 (higher than the atmospheric pressure) is constant. By adjusting the counter-weight 35, a vertical position (reference position) B of the top lid 34 is set for keeping these amounts properly in balance. The balance detector 37 contains the reference position B, an allowable range L to H, caution zones LL to L, and H to HH, and alarm zones LLL to LL, and HH to HHH, which are described later. When the amount of supplied gas exceeds the amount of consumed gas, the internal pressure of the tank 33 increases, thereby causing the top lid 34 to move upward. Conversely, when the amount of supplied gas becomes below the amount of consumed gas, the internal pressure of the tank 33 decreases, thereby causing the top lid 34 to move downward. Based on the reference position B, the lower value L and the upper value H of the allowable range of the top lid 34 are set. In a case where variation in supply and demand stays within the allowable range L to H, the balance detector 37 sends no instruction for action. Outside of the allowable range L to H, lower and upper caution zones LL to L and H to HH are set as predetermined ranges. When the top lid 34 lies within the caution zones LL to L or H to HH, the balance detector 37 sends an instruction to a predetermined portion within the system 1 to cause it to search a cause of such unbalance between supply and demand. Based on the caution zones LL to L and H to HH, lower and upper alarm zones LLL to LL to HH to HHH are set as predetermined ranges. When the top lid 34 lies within the alarm zones LLL to LL or HH to HHH, the balance detector 37 sends an instruction to a designated portion within the system 1 to cancel such an unbalance between demand and supply. And, the instruction is processed and performed to cancel such an unbalance.

How the unbalance is corrected described below. In the range of LLL to LL (i.e., deficiency of gas), the gas turbine 4 is less loaded, or operation of the gas turbine 4 and/or the operation of the gas engine 3 are stopped. When the engines are not allowed to be less-loaded in order to meet a demand for electric power and heat, the gas calorie adjusting device 10 increases production of the low-calorie gas. In the range of HH to HHH, the load of the gas turbine 4 is increased, or the other gas turbine 4 and/or the gas engine 3 which are under temporarily stop are re-started. Or, an exhausting device 38 (FIG. 1) located on downstream side of the gas amount balance monitor device 16 is activated to release the excess gas. The exhausting device 38 may be installed at any desired location of the gas supply pipings 11 and 50, rather than downstream side of the gas amount balance monitor device 16. Also, the number of the exhausting devices 38 is not intended to be limited. The exhausting device is capable of releasing all possible low-calorie gases. The low-calorie gas is not intended to be released to atmosphere for safety, but may be supplied to user points which require the low-calorie gas for other intended application.

The exhausting device 38 comprises the flow meter 43 and the flow rate control valve 44 installed on the mixed gas supply piping 50. The flow meter 43 is adapted to measure the amount of released gas in determining the number of the gas engines 3 or the gas turbines 4 which are to be operated actually. The flow rate control valve 44 is closed in a normal operation. And, as described above, when the amount of gas supply significantly exceeds the amount of gas demand, the flow rate control valve 44 is opened to cancel such unbalance between supply and demand of the gas, so that the gas is released to atmosphere or excess gas is supplied to other user points. That is, the flow rate control valve 44 functions as a relief valve, and therefore, the exhausting device 38 may be called a safety device.

Figure 6:
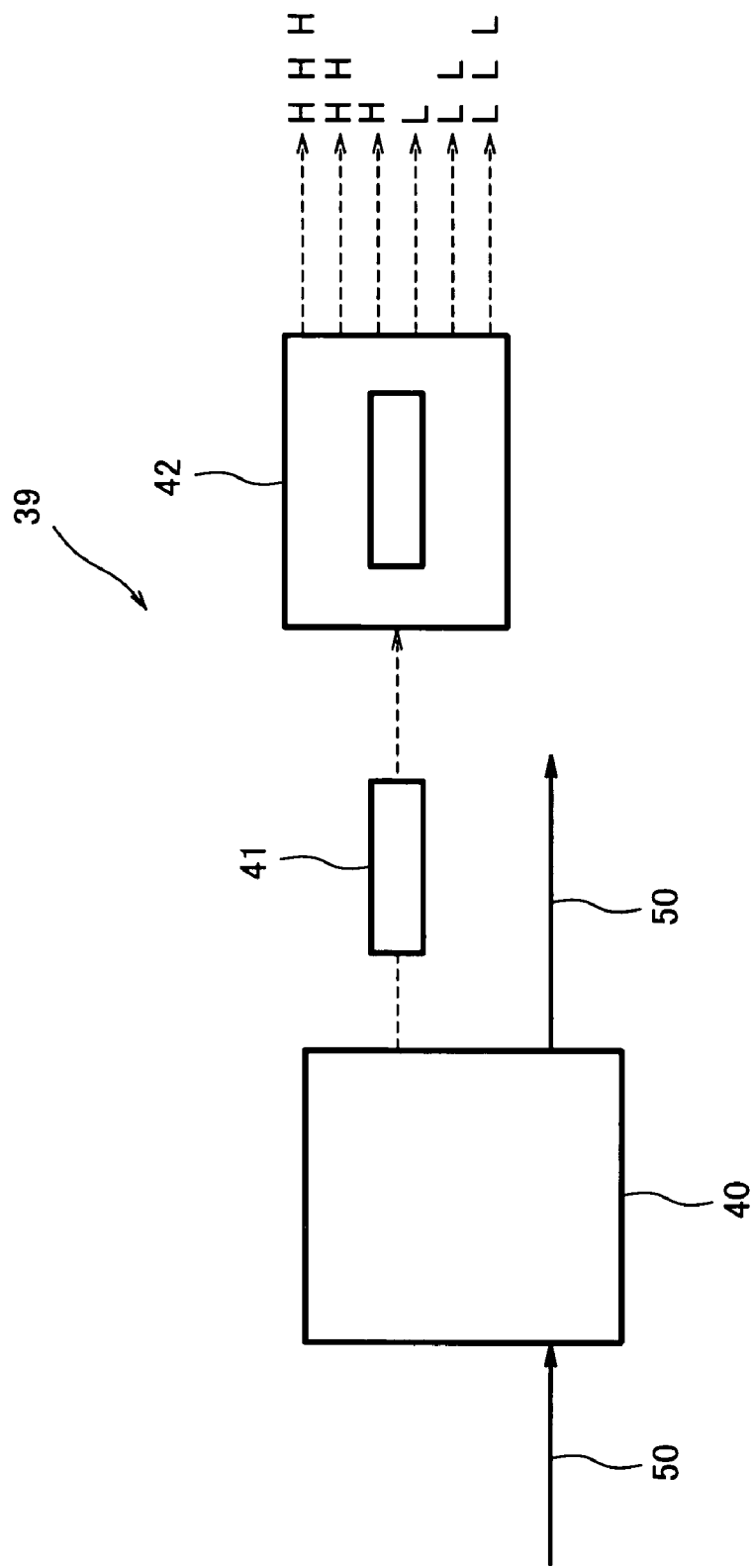
FIG. 6 is a block diagram showing another example of the gas amount balance monitor device in the system in FIG. 1.

FIG. 6 shows a gas amount balance monitor device 39 having another construction. The gas amount balance monitor device 39 comprises a closed tank 40 connected with the mixed gas supply piping 50, a pressure detector 41 configured to detect an internal pressure of the closed tank 40, and a balance detector 42. The internal pressure of the closed tank 40 under such a condition as supply and demand of the gas are properly balanced is set in the balance detector 42 as a reference pressure. In the same manner as described above, an allowable range, caution zones, and alarm zones are set in the balance detector 42 based on a detected pressure. The reference pressure is determined based on performance of the suction device 6. Typically, the reference pressure is approximately 500 mmAq. And, in the same manner as described above, in the caution zones, the balance detector 42 sends an instruction to a designated portion within the system 1 to cause it to search a cause of unbalance between demand and supply of the gas. In the alarm zones, the balance detector 42 sends an instruction to the designated portion in the system 1 to cause it to cancel such an unbalance. And, the instruction is performed to cancel such an unbalance. The unbalance is cancelled in the same manner as described above.

The system 1 comprises a system control device 100 configured to control an operation of the whole system 1. In the system 1, controlling components by control devices 26 and 32 equipped therein, signals sent from the detectors 37 and 42 and meters, controlling the whole system 1 by the system control device 100, are cooperative by carrying out efficient and safe operation. Hereinbelow, an example of the operation of the system 1 is described.

Figure 7:
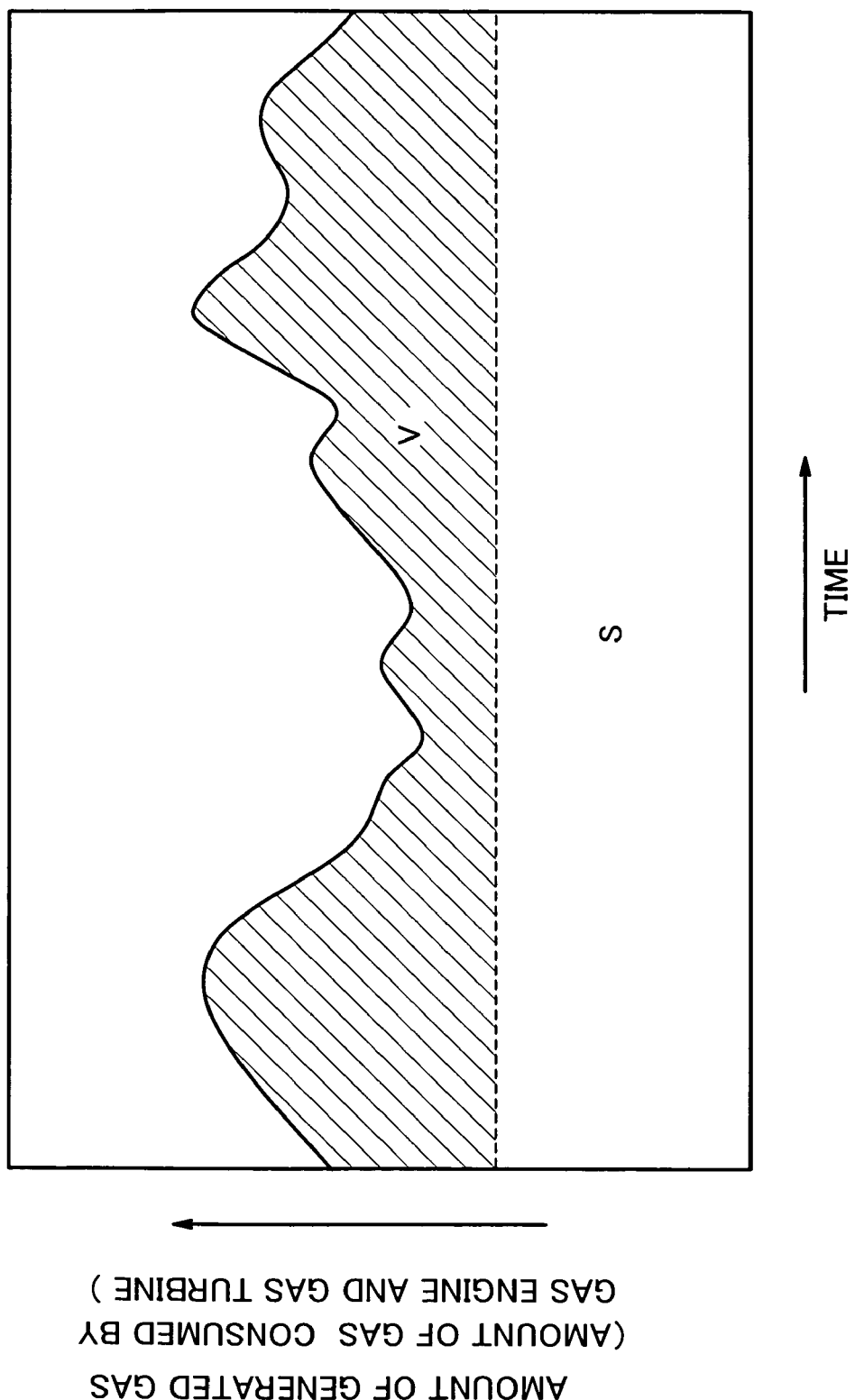
FIG. 7 is a graph showing a relationship between variation in the amount of generated gas and the amount of gas consumed by gas engines and gas turbines in the system in FIGS. 1 and 2.

In a case where the system 1 is installed in, for example, coal mines, the generating condition of the low-calorie gas and the actual amount variation (including maximum and minimum) are usually surveyed in advance. Based on this survey results, gas engines and gas turbines capable of consuming the maximum amount of gas are decided and installed. And, the gas less than a predicted minimum amount is consumed by the gas engines. As shown in FIG. 7, an example of operation of the system 1 is such that varying portion V of the low-calorie gas from the coal beds C or the like, which varies from stable generation amount S, is consumed by the gas turbines 4, and the gas (gas of stable generation amount S) which is less than the predicted minimum amount is consumed by the gas engines 3. When the low-calorie gas is used as fuel, the gas engines are typically operated with ON-OFF mode, because, the gas engines are less suitable for such operation as the load is always varying. On the other hand, the gas turbine can operate easily with varying load, and therefore, the gas with varying amount is more suitable for the gas turbine. In FIG. 7, an abscissa axis represents time such as day week and month, and an ordinate axis represents the amount of generated low-calorie gas.

Figure 8:
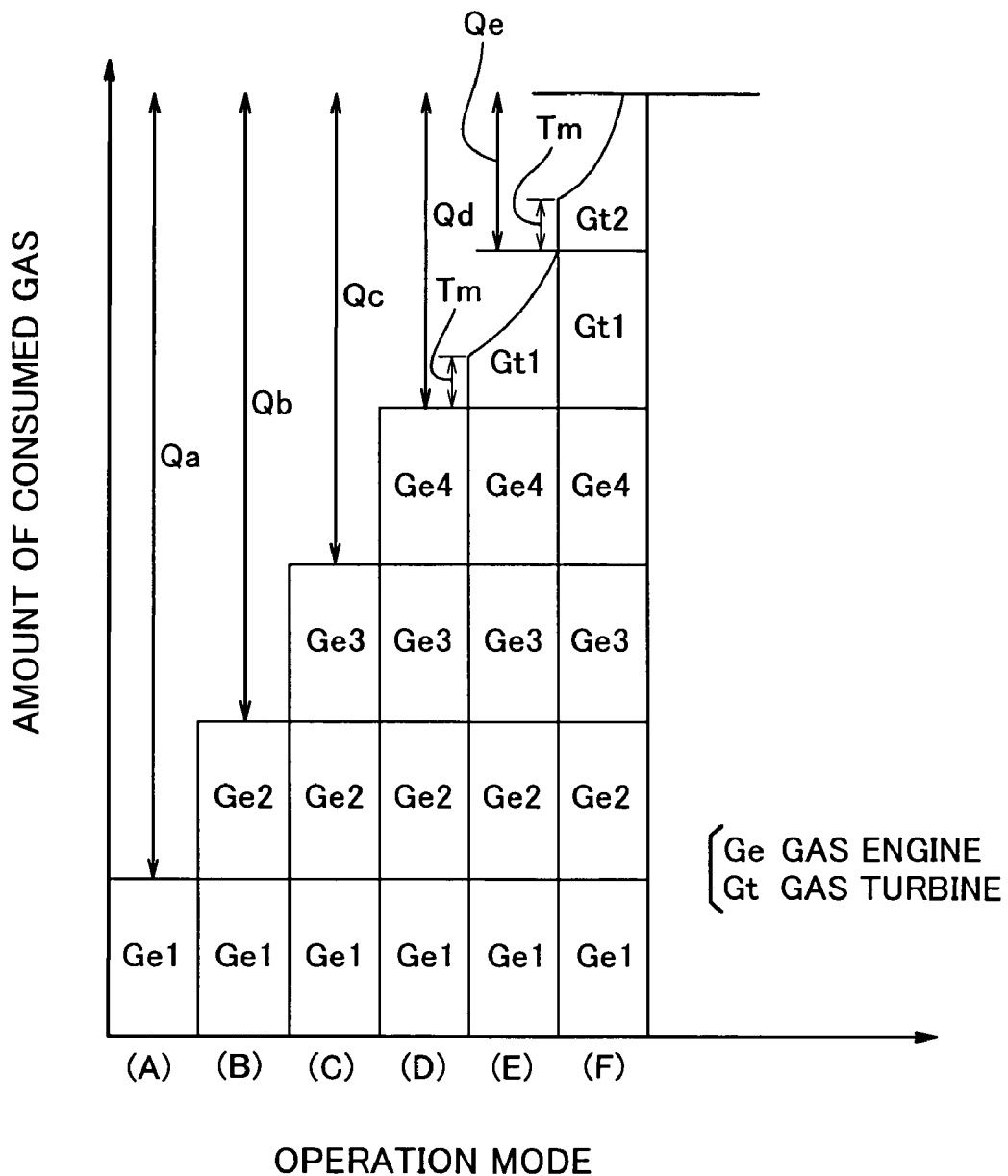
FIG. 8 is a graph showing a relationship between the amount of generated gas and an operation mode in the system in FIGS. 1 and 2.

FIG. 8 shows an example of procedure of starting the system 1. In accordance with this procedure, firstly, a plurality of gas engines 3 are started one after another. Under a steady operation, conditions of the gas engines 3, the gas turbines 4 and the steam turbine 17 are secondly started. Since the gas engines 3 and the gas turbines 4 are designed so that their capabilities of power generation and heat supply, i.e., the maximum amount of gas to be consumed by the gas engines 3 and the gas turbines 4 exceeds the amount of generated gas as described above, some of the gas engines 3 are inactive. In FIG. 8, an abscissa axis represents an operation mode and an ordinate axis represents the amount of gas consumed in the power generation and heat supply yards E and T. Also, the abscissa axis corresponds to time, and the ordinate axis corresponds to a system output. In FIG. 8, each of Ge1 to Ge4 denotes the amount of gas consumed by each gas engine 3, and each of Gt1 and Gt2 denotes the amount of gas consumed by each gas turbine 4. And, each of Qa to Qe denotes the amount of gas released to atmosphere in each operation mode, and Tm denotes the minimum amount of gas necessary to maintain operation of one gas turbine 4.

In general, the gas is always generated from coal beds C with some variation in the amount of collected gas. The gas is suctioned by the suction devices 6 (FIG. 1) as much as possible for the purpose of safety mining in the mine cavities M. Before starting the operation in the power generation and heat supply yards E and T in the system 1, the high-calorie gas and the intermediate-calorie gas, which have been separated from the suctioned gas by the gas separating device 8, are supplied to the corresponding user points U1 and U2 (FIG. 1). On the other hand, since the low-calorie gas can not be utilized by other equipment except the system 1, the low-calorie gas is usually released outside from the exhausting device 38 or the like before the gas engines 3 and the gas turbines 4 are started. Based on the information from the flow meter 43 installed on the exhausting device 38 or the like, the system control device 100 knows the flowing rate of the gas in the low-calorie gas piping 11. In addition, the system control device 100 detects the flow rate of gas consumed by one gas engine 3, the flow rate of gas consumed by one gas turbine 4, and each of the number of the gas engines 3 and the gas turbines 4.

In accordance with an instruction from the system control device 100, the gas engines 3 are sequentially started ((A) to (D) in FIG. 8). Concurrently with this, the flow rate control valve 44 of the exhausting device 38 is gradually closed. During this operation, the system control device 100 compares the information (amount of gas released to atmosphere) from the flow meter 43 of the exhausting device 38 with the amount of gas consumed by a certain gas engine 3, and starts a subsequent gas engine 3. When one of the four gas engines 3 is installed as a spare engine, the three gas engines 3 are started. Then, the system control device 100 compares the information from the flow meter 43 with a minimum amount of gas consumed by one gas turbine 4 (Tm in FIG. 8), and starts one gas turbine 4 ((E) in FIG. 8). When it becomes necessary to release the gas from the exhausting device 38 based on the information from the flow meter 43 while the gas turbine 4 keeps on operating under a load of approximately 100% (full load), other gas turbines 4 are sequentially started ((F) in FIG. 8) to consume the surplus gas. Instead of starting a subsequent gas turbine 4 after the load on one gas turbine 4 becomes full as shown in FIG. 8, a plurality of the gas turbines 4 may be started at the same time and operated under intermediate load.

The above-described procedure for start, i.e., the procedure for sequentially starting of the gas engines 3 and the gas turbines 4 is, of course, applicable to a case where the amount of generated gas is increasing while the operation in the power generation and heat supply yards E and T is partially carried out under a condition in which the gas generates less than normal.

The purpose of the system 1 is to efficiently consume the gas collected from the coal beds C or the like, and to meet demands for electric power and/or heat as much as possible by utilizing the self-producing gas. Therefore, when the gas being generated is sufficient for operating the system 1, all of the gas engines 3 and the gas turbines 4, other than the spare gas engine 3, are operated. Even when the gas being supplied is less in amount and hence some of the gas engines 3 and some of the gas turbines 4 are operating, it is preferable that at least one gas turbine 4 continues to consume the varying portion of the gas. This is because only the gas turbine 4 can easily and smoothly vary its load but the gas engines 3 cannot do so. Also, even when stable generation amount S in FIG. 7 decreases, at least one gas turbine 4 among all gas turbines and gas engines needs to continue to be operated.

When the amount of generated gas decreases during operation of the whole system 1, the following operation is carried out. Specifically, when the system control device 100 receives a signal (LL signal) indicative of the range of LL to L from the gas amount balance monitor device 16, this is recognized by an operating personnel by using a display device or an announce device (not shown). Also, upon receiving a signal (LLL signal) indicative of the range LLL to LL, the system control device 100 sends an instruction to at least one gas turbine 4 to reduce the load. In response to this instruction, the gas turbine 4 decreases the amount of gas consumption. If the gas mount balance monitor device 100 continues to send the LLL signal, the system control device 100 sends an instruction to sequentially stop operation of the gas turbines 4 or the gas engines 3. Also, in this case, in order to consume the gas varying in flow rate, one gas turbine 4 continues to be operated until it comes to stop. Alternatively, as a matter of course, emergency stop of the power generation and heat supply yards E and T may be carried out automatically or manually.

Meanwhile, external information OD relating to energy demand such as electric power demand or steam demand, is memorized in the system control device 100. The system control device 100 controls starting and stopping of the gas engines 3 or the gas turbines 4 by comparing the information OD with actual power generation amount and actual steam supply amount. In an alternative example of the above process, when judging that the low-calorie gas needs to be increased according to energy demand, the system control device 100 sends an instruction to the gas calorie adjusting device 10 to cause it to increase generation of the low-calorie gas.

In a case where electric power demand decreases and steam demand does not change while the amount of generated gas is constant, the system control device 100 sends an instruction to sequentially stop operation of the gas engines 3 and to keep operations of the gas turbines 4. In addition, the system control device 100 sends an instruction to the flow rate control valve 44 of the exhausting device 38, and based on the signal from the gas amount balance monitor device 16 to cause it to open, the open position of the flow rate control valve 44 is adjusted and thereby excess gas is released. Conversely, when only steam demand decreases and electric power demand does not change, the load of the gas turbines 4 is reduced, and the remaining gas engine 3 is started instead. When both electric power demand and steam demand decrease, the gas turbine 4 is operated under a reduced load, and the gas engines 3 are sequentially stopped.

On the other hand, when the amount of gas being generated increases while part of the gas engines 3 and the gas turbines 4 are operating, the gas amount balance monitor device 16 sends a HH signal or a HHH signal, and the number of the gas engines 3 and the gas turbines 4 to be operated is increased under the similar control as in starting the system 1. Also, when the amount balance monitor device 16 sends the HH signal unexpectedly while the whole system 1 is operating, this is recognized by an operator through the display device or the announce device (not shown). Further, when the monitor device 16 sends the HHH signal, the system control device 100 sends an instruction to the flow rate control valve 44 of the exhausting device 38 to cause it to open. And, the system control device 100 adjusts the open position of the flow rate control valve 44 based on the signal from the gas amount balance monitor device 16. Since the signal (such as LLL signal or HHH signal) from the gas amount balance monitor device 16 indicates the deviation from the reference B, the open position of the flow rate control valve 44 is adjusted to cancel such a deviation.

In the above described embodiment, the varying gas amount V is consumed by the gas turbines capable of easily and quickly adjusting the load, and the gas engines 3 consume constantly the gas, that is, the constant amount S less than the minimum V. This is because such an operating method is very effective. However, the present invention is not intended to be limited to this, but the gas turbines 4 may be handled as in the gas engines 3, for example, may be operated in on-off mode depending on the gas generating conditions.

While the coal mine gas collected from coal beds C has been described as a source gas in the above described embodiment, the present invention is not intended to be limited to the CMG. For example, methane generated or extracted from organic polluted sludge during sewage treatment may be used. Also, biomass gas obtained by fermenting biomass of agricultural wastes, biomass of woody wastes, livestock wastes, and other natural wastes, may be used. Furthermore, methane (called landfill gas) generated by fermentation and decomposition of general wastes including garbage in landfill sites may be used.

Source materials of these gases are all wastes, and therefore, the amount of generated gases varies with a lapse of time. In particular, the amount of generated landfill gas decreases with a lapse of time, because of characteristics of the landfill wastes. In order to utilize such gas sources effectively, low-output gas engines together with gas turbines are equipped in a transporter, and moved to landfill sites and installed therein in for a short term use while the gas is available enough.

INDUSTRIAL APPLICABILITY

In accordance with the present invention, self-producing gas being released to atmosphere, which is not used practically but causes air pollution, can be utilized as a clean fuel and converted into such energy as electric power, steam, and the like. Furthermore, the varying portion of the generating gas can be entirely consumed efficiently without loss.

The invention claimed is:

1. An electric power supply system comprising:
a gas engine;
a gas turbine;
a gas collecting device configured to collect a gas being generated;
a gas separating device configured to continuously separate the gas that is supplied from the gas collecting device and has a content of combustible component that varies with time, according to the content of combustible component contained in the gas;
a calorie adjusting device configured to selectively mix gases having different contents of the combustible component which are separated by the gas separating device to adjust the content of the combustible component of the gas to be supplied to the gas engine and the gas turbine;
a system control device configured to control an operation of the gas engine, an operation of the gas turbine, and an operation of the calorie adjusting device; and
a gas amount balance monitor device configured to monitor balance of supply and demand between an amount of the gas consumed by the gas engine and the gas turbine under operating condition and an amount of the gas supplied from the calorie adjusting device to the gas turbine and the gas engine,
wherein the system control device is configured to control the operation of at least one of the gas engine, the gas turbine, and the calorie adjusting device, based on a signal from the gas amount balance monitor device.

2. The electric power supply system according to claim 1, further comprising:
an exhausting device provided on a gas supply passage through which the gas is supplied to the gas turbine and the gas engine, to release the gas within the gas supply passage to outside, wherein
the system control device is configured to control an operation of the exhausting device based on the signal from the gas amount balance monitor device.

3. The electric power supply system according to claim 2, wherein the gas amount balance monitor device is provided on a mixed gas supply passage extending from the calorie adjusting device to the gas engine and the gas turbine, and
the gas amount balance monitor device includes a closed container connected with the mixed gas supply passage, a pressure detector configured to detect an internal pressure of the closed container, and a first balance detector configured to detect a degree of balance supply and demand through comparison between detection results of the pressure detector and a preset reference pressure.

4. The electric power supply system according to claim 2, wherein the gas amount balance monitor device is provided on a mixed gas supply passage extending from the calorie adjusting device to the gas engine and the gas turbine, and
the gas amount balance monitor device includes a container having an upper end opening and configured to connect with the mixed gas supply passage, a top lid configured to be vertically movable along inside of the container and to air-tightly close the upper end opening of the container, a position detector configured to detect a position of the top lid moving vertically according to variation in an internal pressure of the container, and a second balance detector configured to detect a degree of balance of supply and demand based on a detection signal from the position detector.

5. The electric power supply system according to claim 1, wherein the gas amount balance monitor device is provided on a mixed gas supply passage extending from the calorie adjusting device to the gas engine and the gas turbine, and
the gas amount balance monitor device includes a closed container connected with the mixed gas supply passage, a pressure detector configured to detect an internal pressure of the closed container, and a first balance detector configured to detect a degree of balance supply and demand through comparison between detection results of the pressure detector and a preset reference pressure.

6. The electric power supply system according to claim 1, wherein the gas amount balance monitor device is provided on a mixed gas supply passage extending from the calorie adjusting device to the gas engine and the gas turbine, and
the gas amount balance monitor device includes a container having an upper end opening and configured to connect with the mixed gas supply passage, a top lid configured to be vertically movable along inside of the container and to air-tightly close the upper end opening of the container, a position detector configured to detect a position of the top lid moving vertically according to variation in an internal pressure of the container, and a second balance detector configured to detect a degree of balance of supply and demand based on a detection signal from the position detector.

7. The electric power supply system according to claim 1, wherein the system control device is configured to perform control to cause the gas turbine to vary the load according to a signal indicative of variation in the amount of gas supply from the gas amount balance monitor device.

8. The electric power supply system according to claim 1, further comprising a heat recovery boiler connected to the gas turbine.

9. The electric power supply system according to claim 8, further comprising a steam turbine connected to the heat recovery boiler.

10. The electric power supply system according to claim 1, the calorie adjusting device includes a plurality of gas supply passages to which gases separated according to the content of the combustible component by the gas separating device are supplied, a mixed gas supply passage to which the plurality of gas supply passages are connected, the mixed gas supply passage extending to the gas engine and the gas turbine, and opening and closing means configured to adjust open positions of the plurality of gas supply passages.

11. The electric power supply system according to claim 10, wherein the calorie adjusting device further includes an air supply passage connected with the mixed gas supply passage, and the opening and closing means is configured to adjust open positions of the air supply passage and the plurality of gas supply passages.

12. The electric power supply system according to claim 10, wherein the calorie adjusting device includes a feedback combustible component meter provided on the mixed gas supply passage, and a calorie adjustment control device configured to control the opening and closing means to allow the content of the combustible component to be set in a predetermined range, based on measurement results of the feedback, combustible component meter.

13. The electric power supply system according to claim 1, wherein the system control device is configured to perform control to cause at least one gas turbine in operating condition to adjust its load according to variation in an amount of gas supply during the operation of both the gas engine and the gas turbine.

* * * * *

UNITED STATES PATENT AND TRADEMARK OFFICE
CERTIFICATE OF CORRECTION

| | |
|---|---|
| PATENT NO. | : 7,334,391 B2 |
| APPLICATION NO. | : 10/559093 |
| DATED | : February 26, 2008 |
| INVENTOR(S) | : Masaaki Sako and Hideeaki Ota |

It is certified that error appears in the above-identified patent and that said Letters Patent is hereby corrected as shown below:

ON TITLE PAGE, ITEM [54]
    Column 1, line 1, Title, delete "Equipment" and insert -- System --.

And Column 1, line 1, delete "Equipment" and insert -- System --.

Signed and Sealed this

Eighth Day of July, 2008

JON W. DUDAS
*Director of the United States Patent and Trademark Office*